United States Patent
Peckham, Jr.

(10) Patent No.: US 9,890,058 B2
(45) Date of Patent: Feb. 13, 2018

(54) DISSOLVED AIR FLOTATION DESLUDGING IN LIQUID TREATMENT

(71) Applicant: Charles H. Peckham, Jr., Middletown, RI (US)

(72) Inventor: Charles H. Peckham, Jr., Middletown, RI (US)

(*) Notice: Subject to any disclaimer, the term of this patent is extended or adjusted under 35 U.S.C. 154(b) by 90 days.

(21) Appl. No.: 14/685,637

(22) Filed: Apr. 14, 2015

(65) Prior Publication Data

US 2015/0291445 A1    Oct. 15, 2015

Related U.S. Application Data

(60) Provisional application No. 61/979,108, filed on Apr. 14, 2014.

(51) Int. Cl.
*C02F 1/24* (2006.01)
*B03D 1/14* (2006.01)
*C02F 1/52* (2006.01)

(52) U.S. Cl.
CPC ............. *C02F 1/24* (2013.01); *B03D 1/1431* (2013.01); *B03D 1/1462* (2013.01); *C02F 1/52* (2013.01)

(58) Field of Classification Search
None
See application file for complete search history.

(56) References Cited

U.S. PATENT DOCUMENTS 4,618,430 A * 10/1986 Favret, Jr. ............... B03B 11/00
                                                                210/195.4
4,724,075 A *  2/1988 Pfalzer .................. B03D 1/1406
                                                                209/167

FOREIGN PATENT DOCUMENTS

| GB | 2318070 A | * | 4/1998 |
| JP | 53-071259 U | * | 6/1978 |
| JP | 08-309336 A | * | 11/1996 |
| JP | 2004-136244 A | * | 5/2004 |

* cited by examiner

*Primary Examiner* — Thomas M Lithgow
(74) *Attorney, Agent, or Firm* — Adler Pollock & Sheehan P.C.; Daniel J. Holmander

(57) ABSTRACT

A method and apparatus of minimizing the loss of liquid in a dissolved air flotation desludging process, is disclosed. The method and apparatus creates an ambient airflow over the top of the dissolved air flotation tank directed towards a weir at one end of the dissolved air flotation tank whereby sludge floating on top of the liquid is accelerated over the weir at a higher rate than the liquid, thereby conserving the amount of liquid lost over the weir.

10 Claims, 2 Drawing Sheets

DISSOLVED AIR FLOTATION DESLUDGING IN LIQUID TREATMENT

CROSS-REFERENCE TO RELATED APPLICATION

This patent document claims priority to earlier filed U.S. Provisional Patent Application No. 61/979,108, filed on Apr. 14, 2014, the entire contents of which are incorporated herein by references.

BACKGROUND

1. Technical Field

The present patent document relates generally to desludging liquids and more particularly to desludging a dissolved air flotation units in a water treatment process.

2. Background of the Related Art

Dissolved air flotation (DAF) is a liquid treatment process that clarifies the liquid (such as water) by the removal of suspended solids. The removal is achieved by dissolving air in the liquid under pressure and then releasing the air at atmospheric pressure in a flotation tank or basin. Additional chemicals may be used to enhance the effect of the DAF method. The released air forms tiny bubbles which adhere to the suspended matter causing the suspended matter to float to the surface of the liquid where it may then be removed in one of two ways; flushing (i.e. in a hydraulic method) or skimming (or scraping). The choice of using flushing or skimming depends on the further treatment of the sludge.

Intermittent flushing can be obtained in two ways. Either the outlet is closed, which causes the liquid level to rise in the flotation tank and the sludge is flushed out over an overflow weir, or one side of the flotation tank is lowered causing the sludge to flow out. Continuous flushing is done by keeping the liquid level slightly above an overflow weir.

Alternatively or in addition to, the sludge may be removed by a mechanical skimmer. In the case of rectangular flotation tanks, the skimmer mechanism consists of a series of paddles or 'flights' which run on a belt or chain and skim just below the surface of the tank removing the 'float' into a trough for further treatment or, in some instances, recovery of materials. The alternative of circular DAF tanks may incorporate rotating skimmer blades feeding a 'float' trough or involve use of a circulating, revolving scoop.

Regardless of the method used to remove the sludge, it is desirable to minimize the amount of liquid flushed or skimmed away with the sludge. In the case of drinking water or sewage treatment, minimizing the amount of liquid lost can achieve three goals; precious water and process chemicals saved, reduced energy costs, and great cost savings in additional sewer charges.

Therefore, there is a perceived need in the industry for an improved method of desludging to increase the efficiency and reduce costs of the desludging operation.

SUMMARY

The present invention solves the problems of the prior art by providing a modified DAF tank by creating an ambient airflow to enhance the removal of the sludge. In one embodiment, the DAF tank includes one or more fans (or blowers) at one end of the tank configured to blow the sludge toward and over the weir at the other end of the DAF tank.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1:
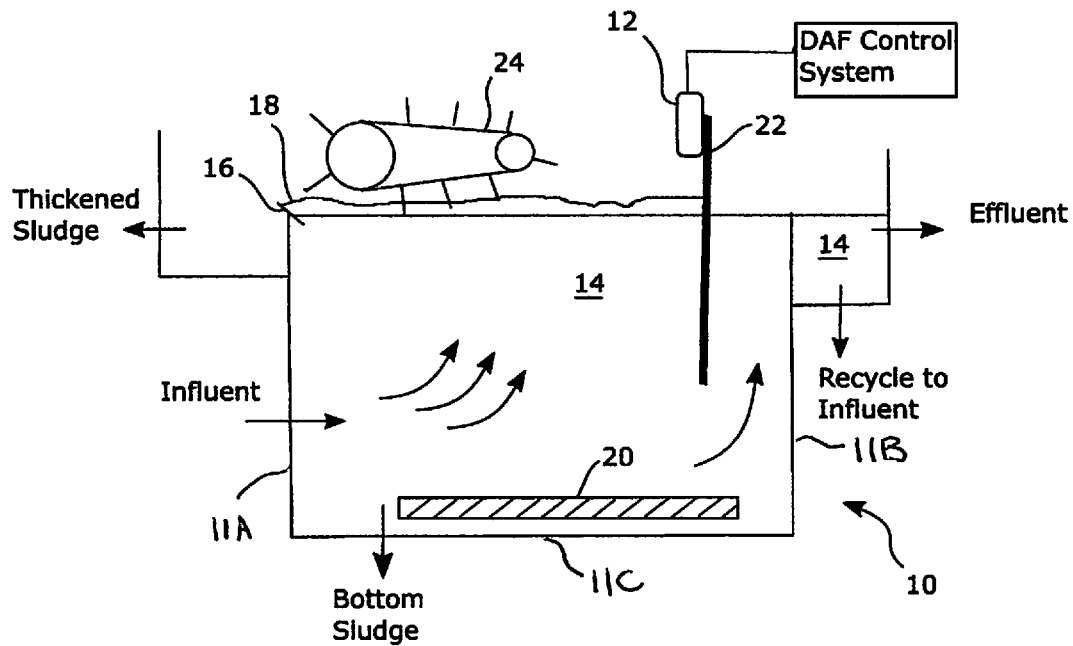
FIG. 1 shows a rectangular DAF tank with multiple fans configured to blow the sludge off of the liquid.

Referring to FIGS. 1-4, an embodiment of the improved DAF tank and method of treating a liquid is shown generally at 10. The DAF tank 10 includes at least two walls 11A, 11B and a bottom 11C. Wall 11A is provided with an inlet (not shown) for enabling influent to pass into the tank 10. The DAF tank 10 also includes a number of fans (or blowers) 12 configured to blow or create an ambient airflow across the top of the treated liquid 14 contained in the DAF tank 10. At the opposite end of the DAF tank 10 is a weir (or dam, beach, or spill way) 16 where sludge 18 and liquid 14 are poured off. The liquid may be coagulated or process water being treated in a drinking water treatment plant; however, this method may be used for separating chemicals and particles from other liquids. Referring to FIG. 1, the liquid 14 shown in the DAF tank 10 has dissolved air released, thereby forming the floating layer sludge 18. The liquid 14 may also have been optionally pre-treated with other coagulation enhancing chemicals and purifying agents as are known in the art. After the release of the dissolved air, the layer of sludge 18 is formed and floats on top of the liquid 14 (which may also be referred to as "white water" as known in the art).

Figure 2:
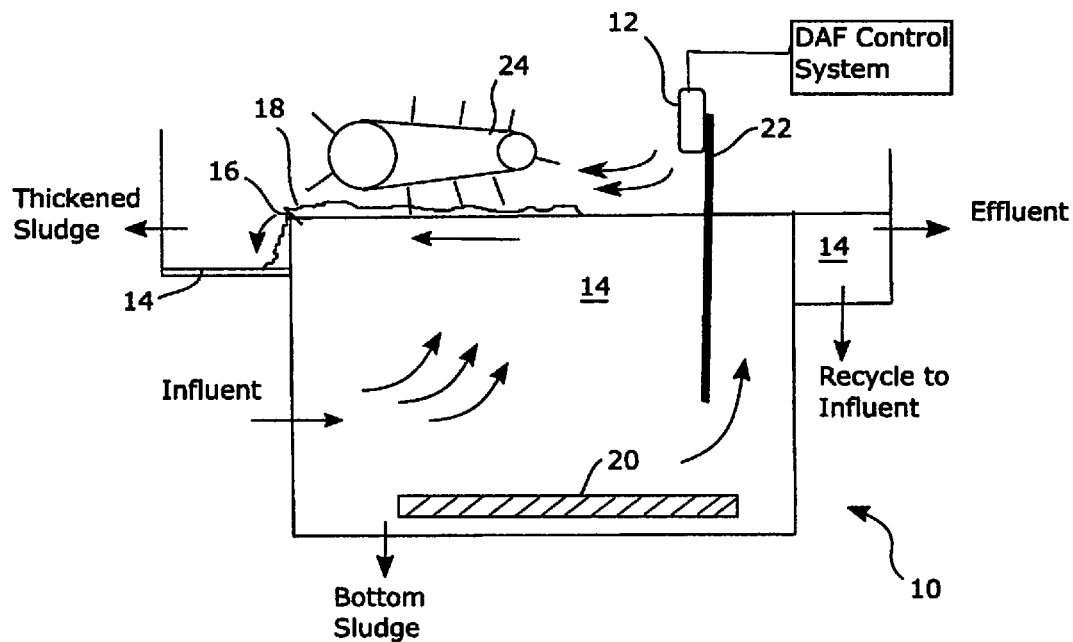
FIG. 2 shows the multiple fans being activated and the sludge starting to separate from the liquid.
Figure 3:
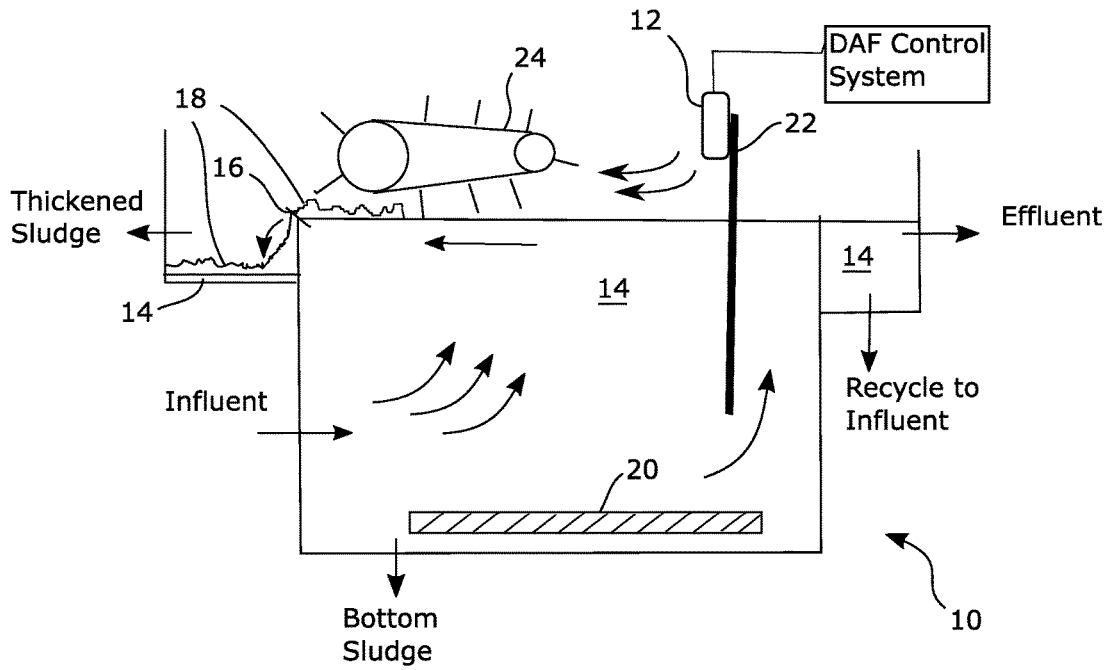
FIG. 3 shows the active, multiple fans showing further separation of the sludge from the liquid.
Figure 4:
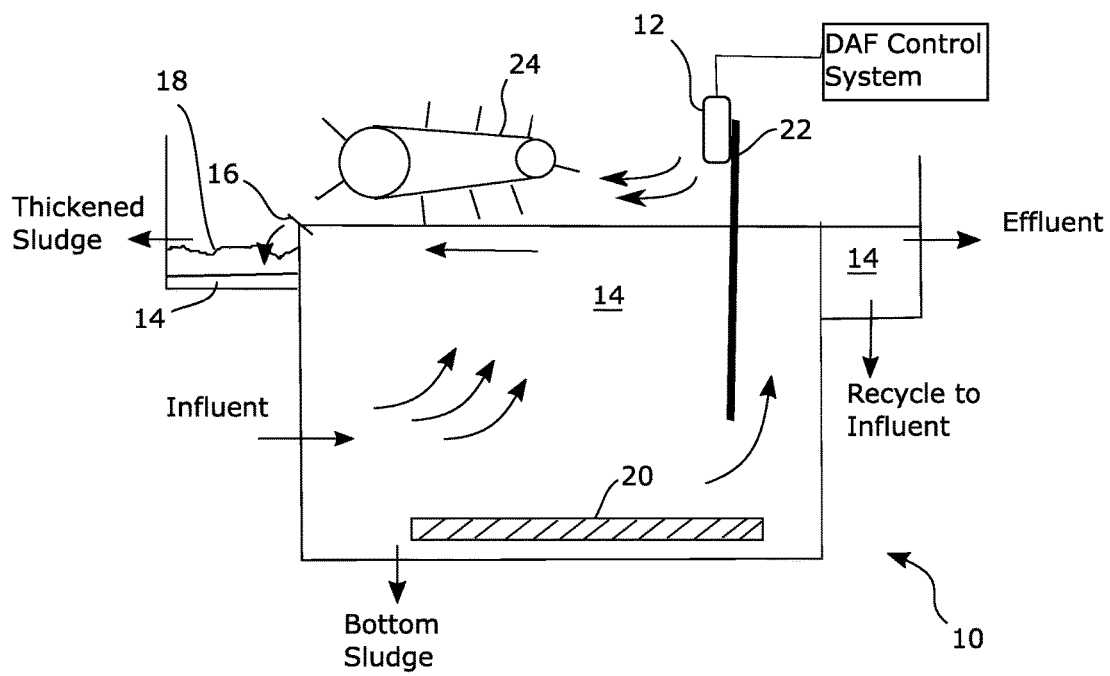
FIG. 4 shows a majority of the tank clear of sludge.

Activation of the one or more fans (or blowers) 12 accelerates the sludge 18 relative to the liquid 14 because the sludge 18 is less dense then the liquid 14. Because the sludge 18 is, in essence, being pushed by the air propelled by the fans 12, the sludge 18 is delivered over the weir 16 at a higher rate than the liquid 14, thereby reducing the amount of liquid 14 lost over the weir 16 with the sludge 18. As can be seen in FIGS. 2-4, the fans 12 efficiently clear the layer of sludge 18 from the top of the liquid 14.

By blowing the sludge 18 across the top of the processed liquid 14, (in this case coagulated water at the head of a drinking water treatment plant) the duration of the desludge operation was cut by more than half (60 seconds to 25 seconds) and still achieved greater results than the prior art hydraulic method alone.

As a result, this method reduces the amount of liquid 14 used by more than half which results in substantial cost savings on the sewer charge, and also a substantial reduction of the usage (and cost) of the coagulant chemical used in the DAF process. This improved removal method of the sludge layer may also allow the operator to increase the time between intervals of desludge events, which further reduce waste of the coagulated or process water.

The fans 12 may be activated continuously, or at timed intervals before, during, and/or after the desludging process.

Controlled intervals of the created ambient air flow can be achieved by the use of timers, relays, solenoids, through integration with the DAF control system, and combinations thereof. The fans 12 may create the ambient air flow directly or indirectly, such as through directionally placed nozzles or air outlets.

This improved DAF tank 10 and method, in addition to greatly enhancing the hydraulic method of desludging, could also be used to replace the skimmer method as well, saving added equipment, labor, and repair costs.

The DAF Tank 10, may also include an auger 20 at the bottom of the DAF tank 10 configured to gently propel heavy bottom sludge where it may be siphoned off from the treated liquid 14. The DAF Tank 10 may also include a baffle 22, subdividing the DAF tank 10 where treated liquid may be drawn off or recycled back into the DAF Tank 10 for further treatment. The DAF Tank may include a skimmer 24 configured and arranged to paddle the sludge 18 and liquid 14 towards the weir 16.

It would be appreciated by those skilled in the art that various changes and modifications can be made to the illustrated embodiments without departing from the spirit of the present invention. All such modifications and changes are intended to be within the scope of the present invention.

What is claimed is:

1. A dissolved air flotation system, comprising:
   a tank having a bottom and a plurality of side walls configured and arranged to hold liquid and sludge floating on top of the liquid, the tank having: a first side wall defining an inlet for receiving a flow of influent raw water; and a second side wall located opposite the first side wall;
   an auger affixed to the bottom, the auger configured to gently propel heavy bottom sludge where it may be siphoned off from treated liquid;
   a weir located on the first side wall above the inlet at one end of a tank;
   a baffle located proximate to the second side wall, the baffle configured to separate influent raw water from treated water;
   an ambient airflow generation mechanism affixed to the baffle, the ambient airflow generation mechanism configured and arranged to create an ambient airflow over the liquid in the tank towards the weir, whereby sludge is accelerated over the weir at a higher rate than the liquid; and
   a control system for regulating the ambient airflow from the ambient airflow generation mechanism.

2. The dissolved air flotation system of claim 1, wherein the liquid is coagulated or process water.

3. The dissolved air flotation system of claim 1, wherein the ambient airflow generation mechanism is a fan or blower.

4. The dissolved air flotation system of claim 3, wherein the ambient airflow generation mechanism is a plurality of fans or blowers.

5. The dissolved air flotation system of claim 1, wherein the ambient airflow generation mechanism generates an ambient airflow continuously.

6. The dissolved air flotation system of claim 5, wherein the ambient airflow generation mechanism is a fan or blower.

7. The dissolved air flotation system of claim 5, wherein the ambient airflow generation mechanism is a plurality of fans or blowers.

8. The dissolved air flotation system of claim 1, wherein the ambient airflow generation mechanism generates an ambient airflow at controlled intervals before, during, or after a desludging event.

9. The dissolved air flotation system of claim 8, wherein controlled intervals of the created ambient air flow is through integration with the control system.

10. The dissolved air flotation system of claim 1 further comprising:
    a skimmer configured to run along the surface of the liquid and propel sludge towards the weir.

* * * * *